(12) United States Patent
Calmels

(10) Patent No.: US 8,676,544 B2
(45) Date of Patent: Mar. 18, 2014

(54) METHOD OF PREDICTING THE AERODYNAMIC BEHAVIOR OF AN AIRCRAFT ELEMENT

(75) Inventor: Benoit Calmels, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 6 days.

(21) Appl. No.: 12/766,465

(22) Filed: Apr. 23, 2010

(65) Prior Publication Data

US 2010/0280802 A1    Nov. 4, 2010

(30) Foreign Application Priority Data

Apr. 24, 2009  (FR) ...................................... 09 02000

(51) Int. Cl.
*G06F 17/50*   (2006.01)

(52) U.S. Cl.
USPC ............................................................ 703/1

(58) Field of Classification Search
USPC ............................................................ 703/1
See application file for complete search history.

(56) References Cited

PUBLICATIONS

Jameson "Computational Aerodynamics for Aircraft Design." Jul. 1989, Princeton University.*

A.M. Rampurawala, et al. "Evaluation of a Simplified Grid Treatment for Oscillating Trailing-Edge Control Surfaces," Journal of Aircraft, vol. 44, No. 4, Jul.-Aug. 2007. pp. 1177-1180.

Mark A. Potsdam, et al. "A Parallel Multiblock Mesh Movement Scheme for Complex Aeroelastic Applications," AIAA, vol. AIAA-2001-0716, XP-002550873, 2001. pp. 1-14.

Abdul M. Rampurawala, et al. "Treatment of Forced Flap Motions for Aeroelastic Simulations of an Arrow Wing," AIAA, vol. AIAA 2005-4962, 2005. pp. 719-734.

U.S. Appl. No. 12/759,138, filed Apr. 13, 2010, Calmels.

* cited by examiner

*Primary Examiner* — Saif Alhija

(74) *Attorney, Agent, or Firm* — Oblon, Spivak, McClelland, Maier & Neustadt, L.L.P.

(57) ABSTRACT

A method for predicting the aerodynamic performance of an aircraft element under predetermined conditions, the aircraft element having at least one break at least partially separating two parts that cannot or should not be modeled with a common envelope form, in which: a digital form representative of the form that the aircraft element assumes under the predetermined conditions studied and in which each break is represented, is created, for each break, a totally non-coincident boundary surface at the joining of the two parts is created, and a partial structured meshing around each part is generated, the two partial meshings made in this way being independent of one another, and digital aerodynamic simulation computations using this meshing are carried out with the aid of an aerodynamic computation code capable of processing a totally non-coincident join.

11 Claims, 1 Drawing Sheet

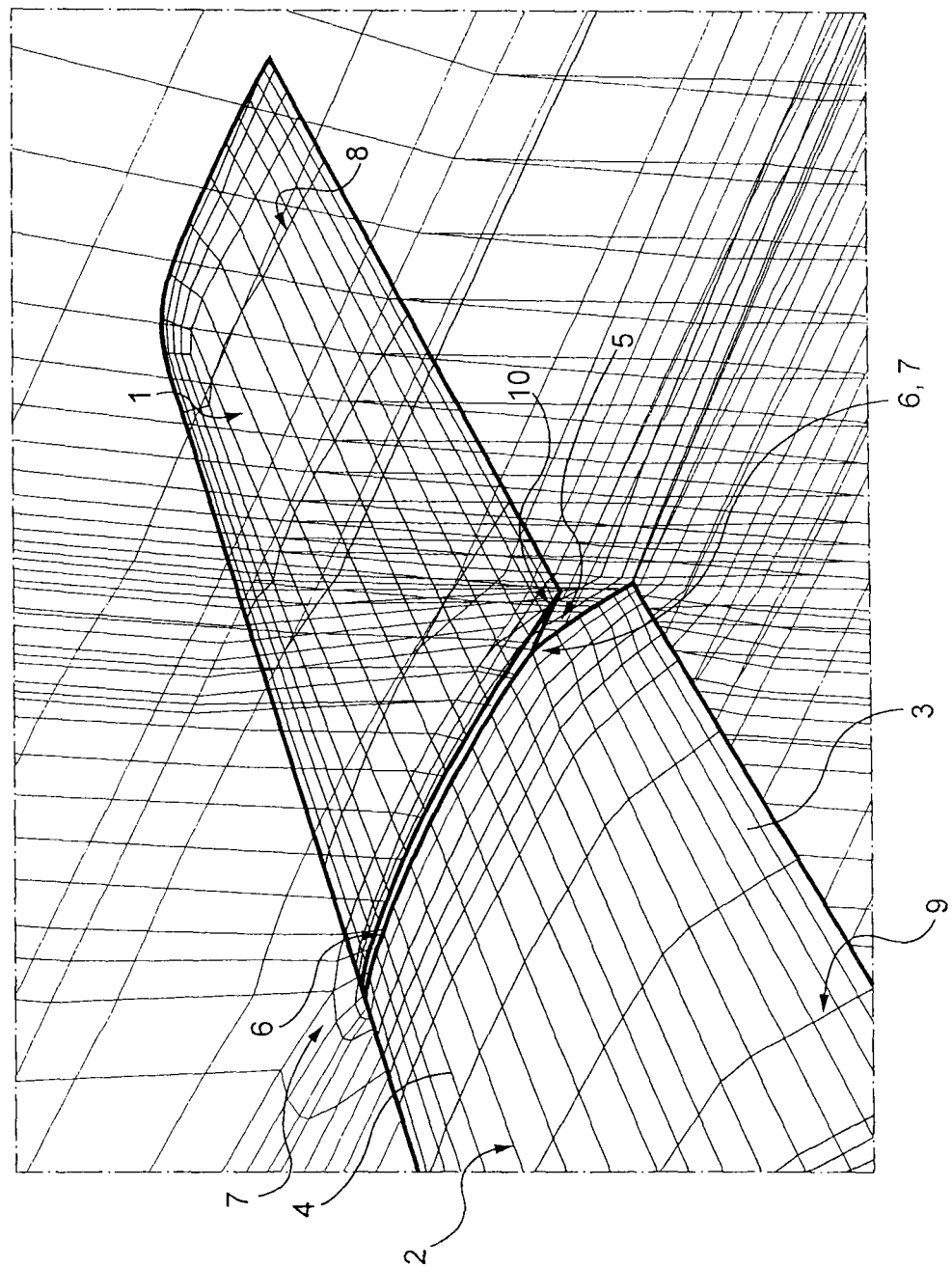

METHOD OF PREDICTING THE AERODYNAMIC BEHAVIOR OF AN AIRCRAFT ELEMENT

BACKGROUND OF THE INVENTION

This invention relates to a method, implemented by computer, for predicting the aerodynamic performance of an aircraft or of a portion of an aircraft. Throughout the following, the phrase "aircraft element" designates, in the particular instance, a portion of an aircraft or an aircraft in its entirety.

The invention applies to aircraft elements having at least one break, and more particularly—but not exclusively—to aircraft elements comprising at least one moving surface, such as a flap, wing flap, slotted flap, Fowler flap, slat, Kruger slat, retractable slotted flap, aileron, spoiler, rudder, elevator....

Predicting the aerodynamic performance of an aircraft element, and in particular of an aircraft element with moving surface(s), is essential in particular in order to make it possible to:

- calculate the loads sustained by the aircraft element and size the structure thereof accordingly and in optimized manner,
- size each moving surface as well as the corresponding actuator,
- work out a flight mechanics model of the aircraft, develop a flight simulator and flying rules,
- determine the operating features of the aircraft, set forth in operating-features and flight manuals.

Any method for predicting the aerodynamic performance of an aircraft element is intended essentially to make it possible to work out an aerodynamic model and to provide estimations of the aerodynamic data that characterize the aerodynamic performance of the aircraft or of the aircraft element. The phrase "aerodynamic data" used here encompasses the following data:

- the aerodynamic coefficients of the aircraft or, as the case may be, of a portion thereof; these coefficients are non-dimensional parameters used for quantifying the forces or moments exerted by the air in motion on a portion or the entirety of the aircraft; among these coefficients there may be cited, for example, the lift coefficient $C_Z$, the drag coefficient $C_X$, the drift or side force coefficient $C_Y$, the roll moment coefficient $C_L$, the pitch moment coefficient $C_M$, the yaw moment coefficient $C_N$ of the aircraft or, as the case may be, of a portion thereof,
- other aerodynamic parameters such as the lift, drag, drift, roll, pitch and yaw efficiencies of each moving surface of the aircraft element; the lift (respectively drag, drift, etc.) efficiency of a moving surface expresses the impact of the total deflection of this moving surface on the lift (respectively drag, drift, etc.) coefficient of the aircraft or, as the case may be, of a portion thereof; these efficiencies have an effect on the flight characteristics of the aircraft;
- the load distribution on the aircraft element, or even any pressure coefficient making it possible to quantify locally the pressure exerted by the air in motion; the stresses sustained locally by the aircraft element determine the sizing thereof,
- the hinge moment of each moving surface of the aircraft element, which corresponds to the torque applied to the hinge during deflection of the moving surface; the hinge moments are necessary to the sizing of the actuators for the moving surfaces.

It is to be noted that the value of an aerodynamic datum depends on a set of operational and environmental conditions, including the angle of incidence, the angle of deflection of each moving surface, the speed of the air flow in relation to the aircraft, the temperature of the air, the pressure.... These conditions also may be defined with the aid of parameters such as: the Reynolds number Re (which represents the relationship between the forces of inertia and the viscous forces); the Mach number Ma (which represents the ratio between the speed of the air flow in relation to the aircraft to the speed of sound); etc.

Various means may be used to work out an aerodynamic model, including semi-empirical methods, digital simulation methods, wind-tunnel tests, flight tests, combinations of the aforementioned means. These means are the subject of ongoing research with a view to their improvement.

The known methods for predicting the aerodynamic performance of an aircraft element by digital simulation generally consist essentially in:

- creating a digital object, known as digital form, representative of the form that the aircraft element assumes under predetermined (in particular operational) conditions,
- making a meshing around the said digital form,
- carrying out digital aerodynamic simulation computations on the basis of predetermined conditions studied with the aid of an aerodynamic computation code, that is to say, a code capable of resolving fluid mechanics equations, these computations providing certain properties (including the pressure) of the fluid around the aircraft element.
- determining aerodynamic data that characterize the aerodynamic performance of the aircraft or of the aircraft element, from the results of the preceding computations.

The determined aerodynamic data for an aircraft must be updated regularly during the various design and development phases of the aircraft, so as to follow the evolutions in geometry of the aircraft and to provide more and more precise estimations of these data.

The methods of prediction by digital simulation used also must be updated regularly during the development of the aircraft, in order to take into account not only the geometric evolutions of the aircraft but also the latest technical advances achieved in terms of digital simulation. Among these advances, there may be cited the improvement of certain physical models such as the one for turbulence, the advent of new digital techniques including the meshing technique known under the name "Chimera," the ongoing increase in the capacity of computation means....

The form of the aircraft element to be studied may make modeling thereof particularly complex. Such is the case for an aircraft element—for example a wing or other wing-group element of an aircraft—comprising one or more high-lift devices or other moving surfaces. The step of meshing of such an aircraft element is particularly delicate. The difficulty is accentuated by the fact that the high-lift devices are both detached from and close to the rest of the wing group. In the earlier known methods, this meshing step consists either in generating an unstructured meshing, or in using the Chimera technique to obtain a structured meshing.

It is recalled that an unstructured meshing generally is made up (in 3D) of tetrahedrons, prisms, hexahedrons and pyramids, assembled in any manner. The topology of such a meshing is arbitrary.

A structured meshing is a meshing that may be generated by reproducing a basic mesh. In such a meshing, any node may be identified (in 3D) by a triplet.

The generation of an unstructured meshing is more automatic, and consequently often faster, than that of a structured meshing, which presupposes the creation of a topology and for this purpose generally requires a human expertise. On the other hand, the generation of a unstructured meshing demands a more extensive description of its elements and a greater random-access memory capacity than those required in the case of a structured meshing. Moreover, the computations carried out on an unstructured meshing generally are longer.

Furthermore, the structured meshings generally provide more precise results than the unstructured meshings, and for various reasons: the modification of the meshing and the local control of the quality of same are easier in structured form; meshing of the boundary layers and of the wakes is of better quality; the digital diagrams (manner in which the equations are introduced into the computation code, discretisation ... ) generally are more precise in the case of a structured computation code (using a structured meshing). It so happens that the precision with which the aerodynamic data are estimated has a direct impact on the weight of the aircraft. Thus for example, insufficiently precise results make it necessary, for safety, to oversize the moving surfaces in order to guarantee a desired level of maneuverability of the aircraft; this oversizing necessitates the use of more powerful and therefore heavier actuators.

For all these reasons, it seems desirable, as regards predicting the aerodynamic performance of an aircraft element, to have methods using structured meshings. Considering the respective advantages and drawbacks of structured and unstructured meshings, it moreover is worthwhile to carry out both digital aerodynamic simulations on the basis of unstructured meshings and simulations on the basis of structured meshings. Also and above all, the development of these two approaches provides a redundancy that makes it possible to detect and eliminate possible errors and to evaluate the precision of the results obtained (if the results obtained with a structured meshing and with an unstructured meshing are close, the precision is high; conversely, far-apart results express a low precision).

The known methods for predicting aerodynamic performance of an aircraft element using unstructured meshings are relatively satisfactory.

On the other hand, the making of structured meshings around an aircraft element with moving surface(s) poses a problem. The only solution known to date that makes it possible to mesh such an element in complex configurations (for example deflected high-lift devices) consists in using the Chimera technique, also called "overset grid method." This technique consists in constructing sub-domains that partially overlap in order to avoid the use of an overall meshing. The boundary conditions must be respected at the physical boundaries between the different sub-domains, which more often than not is obtained through an interpolation.

The known methods using the Chimera technique necessitate substantial computation times and a cumbersome and complex implementation. The making of the meshing and the preparation and execution of the subsequent computations remain very difficult, or even impossible in the most complex configurations (deflected high-lift devices, engine installations represented, flap fairings represented ... ). For the latter, recourse to an unstructured meshing remains the only possibility for carrying out a digital simulation.

SUMMARY OF THE INVENTION

The invention is intended to overcome these drawbacks by proposing a method for predicting the aerodynamic performance of an aircraft element with moving surface(s), using a structured meshing but the implementation of which is faster and simpler than the earlier known methods. The invention thus is intended to reduce the development times and costs of the aircraft.

The invention also is intended to provide a method particularly suited to the computation of high-lift configurations (with one or more moving surfaces in deflection position) and more generally of complex configurations.

Another objective of the invention is to propose a method providing a good precision, or even an increased precision in comparison with earlier known methods.

Another objective of the invention is to propose a method that can be applied to any type of high-lift device.

To accomplish this, the invention relates to a method for predicting the aerodynamic performance of an aircraft element under predetermined conditions, the said method being implemented by computer, the said aircraft element having, under the predetermined conditions studied, at least one break at least partially separating two parts of the aircraft element that cannot be modeled with a common envelope form or that it is not desirable to model with a common envelope form. According to this method:
- a digital object, known as a digital form, representative of the form that the aircraft element assumes under the predetermined conditions studied, is created,
- a meshing is made around this digital form,
- on the basis of the predetermined conditions studied, digital aerodynamic simulation computations using this meshing are carried out.

The method according to the invention is characterized in that:
- the digital form is created so that each break is represented therein,
- for each break, a totally non-coincident boundary surface is created at the joining between the two parts delimited by the said break, at the level of the latter,
- in order to make the meshing, for each totally non-coincident boundary surface created, a meshing—known as partial-structured meshing—is generated around each of the two parts delimited by the said boundary surface, the two partial meshings made in this way being independent of one another,
- in order to carry out the digital aerodynamic simulation computations, an aerodynamic computation code capable of processing a totally non-coincident join is used.

These digital aerodynamic simulation computations, that provide certain properties (including the pressure) of the fluid around the aircraft element, then make it possible to determine the aerodynamic data that characterize the aerodynamic performance of the aircraft or of the aircraft element.

In this way, the method according to the invention provides a fast and easy-to-implement solution to the problem posed by the breaks in the aircraft element. This solution makes it possible to use structured meshings and corresponding computation codes, that impart precision and speed of computation, without having to implement cumbersome techniques such as the Chimera technique.

It is to be noted that throughout the description, the phrases "aircraft element," "wing group," "element part," "wing-group or wing part, portion or section," "break," "high-lift device," "chord," etc., refer either to the corresponding elements of the actual aircraft, or to their representation in digital form representing the aircraft element, or possibly to both, according to the context.

Furthermore, the phrase "envelope form" designates in usual manner a digital form that represents several parts and envelops these parts by filling up the spaces, interstices, slots . . . that may exist between them. The phrase "totally non-coincident boundary surface" designates a surface on both sides of which two meshings are made without making sure that the points of one of the meshings that are located on this boundary surface coincide with points of the other meshing. This phrase is in contrast to the phrase "totally coincident boundary surface," that designates a surface at which each point of one of the meshings coincides with a point of the other meshing, and vice versa; it also is in contrast to the phrase "partially coincident boundary surface," that designates a surface at which one point out of n points (for example one point out of two) of one of the meshings coincides with a point of the other meshing.

Moreover, as defined above, the invention applies to a break such that the two parts that it separates cannot or should not be modeled together with one and the same envelop form, for example because the two parts do not extend in the continuation of one another at the break and their modeling with one and the same envelope form entails an excessively great geometric modification (the impact of which on the results of the computations is significant) and/or the loss of the effect of the break and/or a degradation, deemed excessively great, of the quality of the meshing (meshes very sheared off at the break).

Advantageously, each totally non-coincident boundary surface created according to the invention is a plane.

The method according to the invention advantageously is implemented in the case of a wing-group element of the aircraft. Each break then corresponds to the joining between:
- on the one hand, a wing-group part, known as high-lift part, comprising a high-lift device that moreover is in deflected position under the predetermined conditions studied,
- and on the other hand
  - another high-lift wing-group part (that is to say a wing-group part comprising another high-lift device, in deflected position), the high-lift devices of the two high-lift parts being offset from one another, either because they are not disposed in the continuation of one another spanwise, or because they are deflected according to different angles,
  - or one wing-group part, known as non-high-lift part, without a high-lift device or comprising a high-lift device that is in non-deflected position under the predetermined conditions studied.

Advantageously, each break is represented by a slot, known as break slot, encroaching on at least one of the two parts separated by the said break. Preferably, each break between a high-lift part and a non-high-lift part is represented by a break slot fully encroaching on the non-high-lift part, so as not to alter the representation of the high-lift device in deflected position.

Advantageously, each break is represented by a break slot having a width ranging between 1 and 2% of the local chord of the wing-group element measured at the said break.

Advantageously, each totally non-coincident boundary surface created is a plane parallel to the chord of the wing-group element, that is to say, parallel to an axis representing the roll axis (Ox axis) of the aircraft.

Advantageously, each totally non-coincident boundary surface created is a plane either vertical or perpendicular to the plane of the wing-group element. It is to be noted that in usual manner, the plane of a wing-group element (wing, for example) is indicated by the location of the front quarter of the chords of the wing group.

Advantageously, the method according to the invention furthermore has one or more of the following characteristics:
- an aerodynamic computation code of CFD ("Computational Fluid Dynamics") type is used,
- partial structured meshings of Euler type are generated and an aerodynamic computation code based on the Euler equations is used,
- partial structured meshings of Navier-Stokes type are generated and an aerodynamic computation code based on the Navier-Stokes equations are used,
- in the digital form created, each part of the aircraft element is represented with the aid of a smooth envelope form,
- conversely, the digital form is created so that each or only some of the longitudinal slots of the high-lift devices are represented therein. These slots may be processed as breaks in the sense of the invention, that is to say may be the subject of creation of a totally non-coincident boundary surface. As a variant and preferably, the two parts that each of these longitudinal slots delimits are processed as partially or totally coincident blocks; structured meshings surrounding these two parts then are generated so as to be partially or totally coincident at the said longitudinal slot.

The invention extends to a digital simulation tool comprising software means, capable of implementing the method according to the invention. This tool advantageously comprises a recording medium in which there is stored a computer program which, when it is run in a computer, performs the steps of the method according to the invention. The digital simulation tool may be limited to this recording medium or constitute a complex computer group comprising other hardware and software means, such as, for example, a central processing unit, other recording mediums, data-entry means, display means. . . .

BRIEF DESCRIPTION OF THE DRAWINGS

Other details and advantages of this invention will become apparent upon reading of the following description, which refers to the sole attached FIGURE and concerns preferential embodiments, provided by way of non-limitative examples.

This FIGURE is a schematic view of a digital modeling according to the invention representing a wing of an aircraft.

DETAILED DESCRIPTION OF THE INVENTION

According to the invention, in order to predict the aerodynamic performance of an aircraft wing, one proceeds as follows.

In a first step, a digital form representative of the form that the wing assumes under predetermined operational and environmental conditions is prepared. The operational conditions to be determined prior to the implementation of the method according to the invention relate in particular to the deflection or non-deflection of the moving surfaces of the wing and the angles of deflection chosen, as the case may be.

On the attached FIGURE, a digital form representing an aircraft wing, created according to the invention, may be seen in part. On this digital form, a non-high-lift part 1 corresponding to an end section of the wing is perceived. It is to be noted that this end section in reality is equipped with a low-speed aileron. Nevertheless, under the predetermined conditions studied here, the low-speed aileron is in non-deflected position, so that the part 1 constitutes a non-high-lift part in the sense of the invention. The corresponding section of the wing, however, could constitute a high-lift part under other predetermined conditions (with the low-speed aileron deflected).

The digital form illustrated furthermore comprises a high-lift part 2, that corresponds to the section of the aircraft wing delimited laterally by the outer flap. This high-lift part 2 comprises the said outer flap 3 and the fixed wing-group portion 4 that extends opposite the said flap along the roll direction (Ox axis) of the aircraft. Under the predetermined conditions studied here, the flap 3 is deflected according to a deflection angle of 35°.

Between the high-lift part 2 and the non-high-lift part 1, there is formed a break 5, that partially separates the two parts. At this break 5, the two parts are offset from one another so that their representation with a common envelope form spanwise (pitch direction, Oy axis of the aircraft) is impossible or has drawbacks (necessary modification of the geometry and corresponding loss of precision, degradation of the meshing, loss of the aerodynamic effect of the break . . . ). Apart from this break, the two parts extend in the continuation of one another spanwise and are continuously connected.

The wing thus is divided spanwise into two or more parts depending on the number of breaks formed by the high-lift devices of the wing in deflected position.

According to the invention, the digital form representing the aircraft element studied is created so that each break is represented therein, to an extent allowing the definition of a totally non-coincident plane (or other boundary surface) at the said break. It is possible to create the digital form of the aircraft element entirely. If on the contrary a preexisting digital form is used, there is need to make sure that the joinings between the high-lift and non-high-lift parts of the form used make it possible to position totally non-coincident planes. As regards the illustrated wing, the joining 6 between parts 1 and 2 in particular must comprise a slot, known as break slot, between the outer side edge of the flap 3 and the wing-group portion 10 located in the continuation thereof spanwise. If this break slot is not present in the digital form used, it is advisable to create it by encroaching, either on the high-lift part or on the non-high-lift part or on the two parts. Except in special circumstances, encroachment on the non-high-lift part will be favored so as not to modify the high-lift device. The break slot created in this way preferably has a slot width equivalent to 1 to 2% of the local chord of the wing.

Furthermore, in the illustrated example, each part 1, 2 is represented with the aid of an envelope form. In other words, the two longitudinal slots (slots extending spanwise) that in reality comprise the flap 3 are represented filled up, and the fixed wing-group portion 4 and the flap 3 are processed as one and the same part 2 for purposes of their modeling. In this respect, it will be noted that the presence of the flap 3 does not prevent the use of an envelope form along the direction of the chord, whereas it prevents or makes undesirable the use of such an envelope form spanwise for the unit formed by parts 1 and 2.

As a variant, it is possible to represent the longitudinal slots of the flap 3 and the cavity formed at the rear of the fixed wing-group portion 4 making it possible to stow the flap in retracted position. The digital form created in this way is certainly more complex, but even so, it allows the making, in relatively short time periods, of a structured meshing (see below) very satisfactory in terms of agreement of the results of the computations.

In a second step, a meshing of Euler or Navier-Stokes type is made around the digital form created. It is recalled that a Navier-Stokes meshing differs from a Euler meshing by the refinements near the walls and in their continuation along the direction of the air flow, so as to be able to compute the boundary layers and the wakes.

To this end, first of all a totally non-coincident (TNC) plane is positioned at each joining between the high-lift and non-high-lift parts of the aircraft element, in the aforementioned break slots. Thus, for example, a TNC plane 7 is positioned at the break 5. This plane is positioned in the direction of the chord of the wing (roll direction of the aircraft) and is either vertical (as illustrated), or perpendicular to the plane of the wing (the plane of the wing forming with the horizontal an angle called the wing dihedral).

Each TNC plane thus positioned, the meshing is made around the wing. For this purpose, each non-high-lift part 1 or high-lift part 2 is meshed independently of the other parts by virtue of the separations introduced by the TNC planes, which considerably facilitates the making of the mesh. Thus there are made as many meshings 8, 9, known as partial meshings, as the wing comprises parts 1, 2 separated by TNC planes. According to the invention, each partial meshing made is a structured meshing (of Euler or Navier-Stokes type). It is to be noted that each partial meshing may comprise several blocks.

In a third step, digital aerodynamic simulation computations are carried out, based on the resolution of the Euler equations or on the resolution of the averaged Navier-Stokes (RANS) equations according to the meshings made and on the basis of the latter. To accomplish this, an aerodynamic calculation code capable of processing totally non-coincident joins is used, which generally is the case for the current structured codes. It will be possible to ascertain that the aerodynamic field is not subjected to discontinuity at the crossing of the TNC planes by making cuts perpendicular to these planes. A computation code is a computer program allowing the simulation of a physical process, here an aerodynamic process. A computation code is the result of several successive steps: modeling hypotheses, generally leading to a system of differential equations, an algorithm for resolution of these equations, computer coding of this algorithm. The industrialized computation codes generally comprise a pre-processor making it possible to enter the computation data (meshing . . . ) and a post-processor allowing graphic plotting of the results, as the case may be.

In a fourth step, aerodynamic data are determined by computation, from the results of the digital aerodynamic simulation computations previously carried out.

A plurality of computation series advantageously may be undertaken by varying different environmental and operational parameters (angle of incidence, Reynolds number, Mach number . . . ). The results of the computations carried out in this way then may be used to size the wing and its different moving surfaces, to determine the flight characteristics and the operating features of the aircraft, to establish flying rules, etc. The modeling of the wing in high-lift configurations with one or more moving surfaces deflected (according to different deflection angles) makes it possible in particular to study the ground effect. The representation of the longitudinal slots of the moving surfaces makes it possible to study the impact of these slots and of the viscosity of the air in open air and in ground effect, and to investigate stall in open air and in ground effect.

The invention may be the object of numerous variants in relation to the illustrated embodiment, so long as these variants fall within the scope defined by the claims.

The invention claimed is:

1. A method for predicting the aerodynamic performance of an aircraft element under predetermined conditions, the method performed by a computer including a processor, the aircraft element having, under the predetermined conditions studied, at least one break at least partially separating two parts of the aircraft element that cannot be modeled with a common envelope form or that it is not desirable to model with a common envelope form, the method comprising:

creating, by the processor, a digital object representative of a form that the aircraft element assumes under the predetermined conditions studied, and the digital object is created so that each break is represented therein;

creating, using the processor, a meshing around the digital object;

on the basis of the predetermined conditions studied, carrying out digital aerodynamic simulation computations using the meshing;

for each break, creating a totally non-coincident boundary plane at the joining between the two parts delimited by the break, at the level of the break;

making the meshing, for each totally non-coincident boundary plane created, by generating a partial structured meshing around each of the two parts delimited by the created totally non-coincident boundary plane, the two partial structured meshing not overlapping each other and being independent of one another; and carrying out the digital aerodynamic simulation computations, by using an aerodynamic computation code processing a totally non-coincident join, wherein the created totally non-coincident boundary plane designates a plane on respective sides of which the two partial structured meshing are made, the two partial structured meshing being generated such that points of one meshing located on the created totally non-coincident boundary plane are not ensured to coincide with points of the other meshing located on the created totally non-coincident boundary plane.

2. The method according to claim 1, wherein the aircraft element is a wing-group element of the aircraft and each break corresponds to the joining between:

a wing-group part that is a high-lift part, including a high-lift device in a deflected position under the predetermined conditions studied; and another high-lift wing-group part, the high-lift devices of the two high-lift parts being offset from one another, or a wing-group part, that is a non-high-lift part, without a high-lift device or including a high-lift device that is in a non-deflected position under the predetermined conditions studied.

3. The method according to claim 1, wherein each break is represented by a break slot, encroaching on at least one of the two parts separated by the break.

4. The method according to claim 2, wherein each break between a high-lift part and a non-high-lift part is represented by a break slot fully encroaching on the non-high-lift part.

5. The method according to claim 3, wherein each break is represented by a break slot having a width ranging between 1 and 2% of a local chord of the wing-group element measured at the break.

6. The method according to claim 2, wherein each totally non-coincident boundary plane created is a plane parallel to the chord of the wing-group element.

7. The method according to claim 2, wherein each totally non-coincident boundary plane created is a plane either vertical, or perpendicular to the plane of the wing-group element.

8. The method according to claim 1, wherein, in the digital object created, each part of the aircraft element is represented with aid of an envelope form.

9. The method according to claim 2, wherein the digital object is created so that each or only some longitudinal slots of high-lift devices are represented therein.

10. A digital simulation tool comprising software means capable of implementing a method according to claim 1.

11. The method according to claim 1, wherein the created totally non-coincident boundary plane is positioned in a direction of the chord of a wing of the aircraft and is one of vertical and perpendicular to a dihedral of the wing.

* * * * *